United States Patent [19]

Suzuki et al.

[11] Patent Number: 4,621,191

[45] Date of Patent: Nov. 4, 1986

[54] SELF-SCANNING TYPE PHOTOELECTRIC CONVERSION ELEMENT DRIVE DEVICE RESPONSIVE TO DIFFERENT DETECTED LIGHT INTENSITIES FOR FOCUS DETECTION

[75] Inventors: Koji Suzuki; Masahiro Kawasaki; Harumi Aoki, all of Tokyo, Japan

[73] Assignee: Asahi Kogaku Kogyo Kabushiki Kaisha, Tokyo, Japan

[21] Appl. No.: 583,533

[22] Filed: Feb. 24, 1984

[30] Foreign Application Priority Data

Feb. 24, 1983 [JP] Japan .................. 58-28614

[51] Int. Cl.⁴ .......................... G03B 3/10; G03B 7/08
[52] U.S. Cl. .................................. 250/201; 354/406
[58] Field of Search ............... 250/201, 201 PF, 204; 354/402, 404, 406, 407, 408, 409; 356/4

[56] References Cited

U.S. PATENT DOCUMENTS 4,349,254 9/1982 Jyojiki et al. ................. 250/201 PF
4,352,545 10/1982 Uno et al. ........................... 250/204
4,527,053 7/1985 Kinoshita et al. ............. 250/201 PF Primary Examiner—Edward P. Westin
Attorney, Agent, or Firm—Sughrue, Mion, Zinn, Macpeak & Seas

[57] ABSTRACT

A self-scanning type photoelectric conversion element drive device, particularly, such a drive device applied to a focus detecting device of a camera, in which the effective dynamic range of the device is made very broad without a complex circuit arrangement. First and second photoelectric element arrays are scanned serially in the case that a sensed light intensity is below a predetermined value and scanned in parallel when the light intensity exceeds the predetermined value. For serial scanning, the outputs of the photoelectric elements are applied directly to an output terminal. In the case of parallel scanning, the output of one of the arrays is stored in a memory and then applied to the output terminal.

6 Claims, 15 Drawing Figures

SELF-SCANNING TYPE PHOTOELECTRIC CONVERSION ELEMENT DRIVE DEVICE RESPONSIVE TO DIFFERENT DETECTED LIGHT INTENSITIES FOR FOCUS DETECTION

BACKGROUND OF THE INVENTION

The present invention relates to a self-scanning type photoelectric conversion element drive device which is used to detect the correct focusing position of a photographing lens employing a detected light intensity distribution such as the variation of contrast of an image.

A self-scanning type photoelectric conversion element drive device has been known in the art in which a self-scanning type photoelectric conversion element including a pair of photoelectric element arrays, each composed of a plurality of individual photoelectric detecting elements, is arranged at a position equivalent to the photographing plane of a photographing lens, and the photographing element arrays are scanned to obtain contrast values of the image at positions in front of and behind the photographing plane, thereby to detect the position at which the photographing lens is correctly focused. The contrast values of the image provided by the photoelectric elements has a distribution having a single peak at the focused position. The symmetry of the contrast distribution as reflected in the outputs of the photoelectric element arrays is utilized to detect the focused position.

If the charge accumulation time of the photoelectric elements is changed in inverse proportion to the average light intensity of the image, the photoelectric element arrays provide a constant output at all times. Accordingly, by varying the charge accumulation time, the range of effective dynamic range of the photoelectric element arrays can be made very broad. The charge accumulation time can be changed by varying the scanning frequency of the photoelectric element arrays. However, the scanning frequency is limited by the speed of operation of a contrast detecting circuit which processes the outputs of the photoelectric element arrays.

If the photoelectric element arrays are scanned in parallel (at the same time), the effective dynamic range of the device can be compared with what can be obtained using serial scanning. Accordingly, where only the dynamic range is taken into acount, parallel drive is advantageous over serial drive. However, in order to carry out parallel driving, it is necessary to provide a contrast detecting circuit of intricate construction for each photoelectric element array. Accordingly, the overall circuit arrangement of the device becomes complex and the manufacturing cost is increased.

As is apparent from the above description, the conventional self-scanning type photoelectric conversion element drive device involves two apparently conflicting requirements: an increase in the dynamic range and a simplification of the circuit arrangement. It is thus a primary object of the present invention to provide a self-scanning type photoelectric conversion drive device in which these two seemingly conflicting requirements are met.

SUMMARY OF THE INVENTION

In accordance with the above and other objects, the invention provides a self-scanning type photoelectric conversion element drive device in which, when the light intensity is below a predetermined value, the photoelectric element arrays are scanned serially (in time series) and the outputs of the photoelectric element arrays are processed directly by a single processing circuit, whereas if the light intensity exceeds the predetermined value, the photoelectric element arrays are scanned in parallel. In the latter case, the outputs of the photoelectric element arrays are stored in a memory section, and then read out therefrom in series to be processed by the same processing circuit. Thus, in the device of the invention, the circuitry is simplified while the dynamic range is increased.

DESCRIPTION OF THE PREFERRED EMBODIMENTS

An example of a self-scanning type photoelectric conversion element drive device constructed according to the present invention applied to the focusing detecting device of a photographing apparatus such as a still camera or a video camera will be described with reference to the accompanying drawings.

Figure 1:
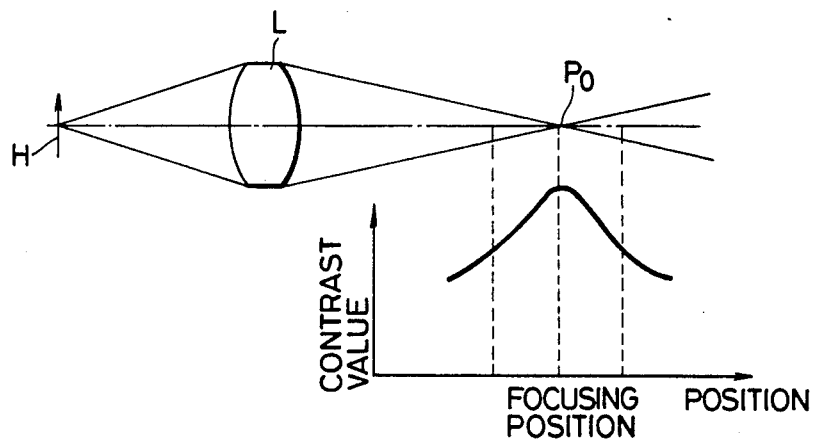
FIG. 1 is an explanatory diagram indicating the contrast distribution of an image formed by the optical system of an image pickup device to which the technical concept of the invention is applied.

In FIG. 1, reference character L designates a photographing lens. It is assumed that correct focusing of the lens L on an object H is obtained at a point $P_0$. The contrast of the image of the object H has a distribution curve having a peak value at the focused position; that is, the contrast distribution curve is symmetrical with respect to the focused position. The invention has been developed on the premise that the contrast distribution curve is symmetrical around the focused position.

Figure 2:
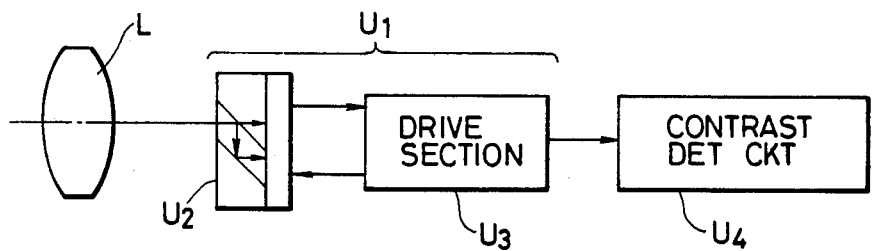
FIG. 2 is a block diagram outlining the arrangement of a self-scanning type photoelectric conversion element drive device constructed according to the invention.

FIG. 2 is an explanatory diagram showing a self-scanning type photoelectric conversion element drive device $U_1$. The device $U_1$ includes a photoelectric conversion section $U_2$ and an element drive section $U_3$ therefor. The photoelectric conversion section $U_2$ is arranged at a position equivalent to the position of the photographing surface of the photographing lens L. The output of the element drive section is processed by a contrast detecting circuit $U_4$.

Figure 3:
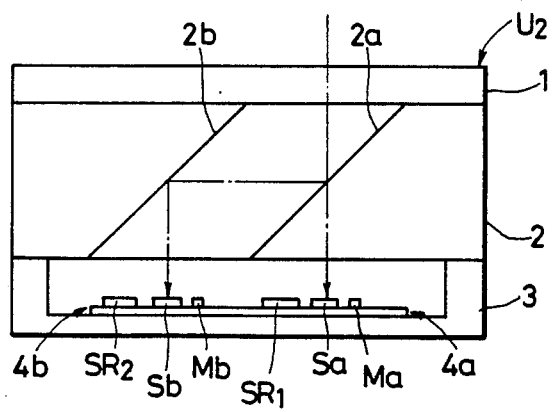
FIG. 3 is a side view of a photoelectric conversion section in FIG. 2 showing an optical path therein.

FIG. 3 shows the photoelectric conversion section $U_2$ in more detail. A light flux from the photographing lens L passes through an infrared absorbing filter 1 and is then split into a transmitted light beam and a reflected light beam by a half-silvered mirror of an optical splitter 2. The transmitted light beam is applied to a photoelectric element array $S_a$ forming one self-scanning type photoelectric conversion element 4a in an element package 3, while the reflected light beam is applied to a photoelectric element array $S_a$ forming the other self-scanning type photoelectric conversion element 4b. That is, the photoelectric element arrays $S_a$ and $S_b$ are arranged at positions equivalent to positions which are on either side of the photographing plane and which are equidistant from the latter on the optical axis of the photographing lens L. The photoelectric element arrays $S_a$ and $S_b$ are provided with light detecting element arrays $M_a$ and $M_b$ and scanning circuits $SR_1$ and $SR_2$, respectively.

Figure 4:
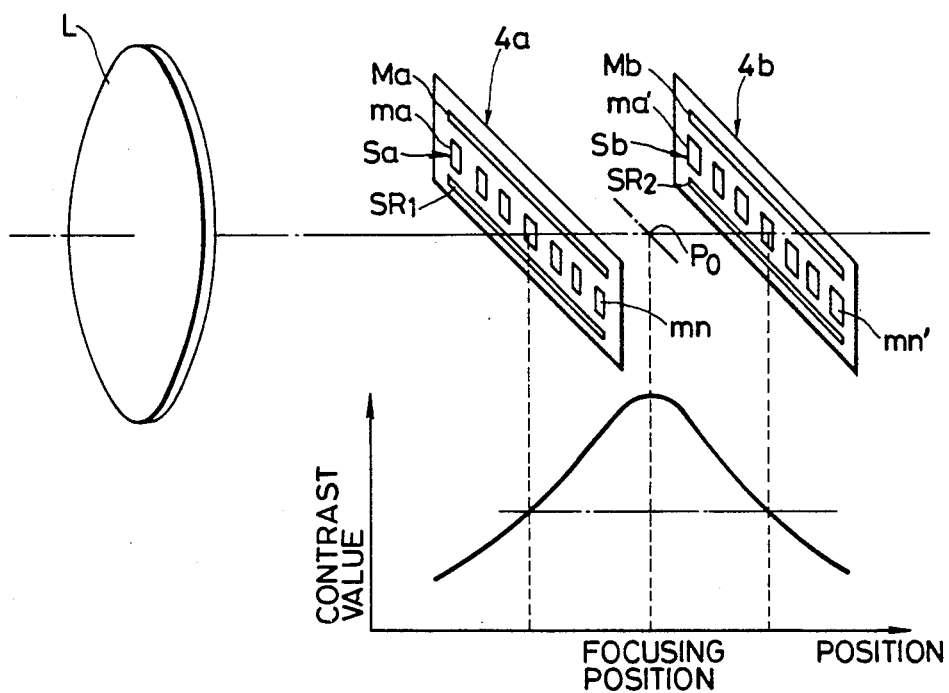
FIG. 4 is an explanatory diagram showing the relationships between the photoelectric element arrays and the contrast distribution.

As shown in FIG. 4, the photoelectric element array $S_a$ is composed of small photoelectric elements $m_a$ through $m_n$ arranged in a row, and similarly the photoelectric element array $S_b$ contains small photoelectric elements $m_a'$ through $m_n'$ arranged in a row. More specifically, the photoelectric elements $m_a$ through $m_n$ and $m_a'$ through $m_n'$ are arranged at positions corresponding to the parts of an optical intensity distribution which is provided by the light detecting element arrays $M_a$ and $M_b$, and charges are accumulated in the photoelectric elements in amounts corresponding to the intensity of the received light. The photoelectric elements $m_a$ through $m_n$ and $m_a'$ through $m_n'$ are scanned by the scanning circuits $SR_1$ and $SR_2$, respectively, in a manner to be described later.

Figure 5:
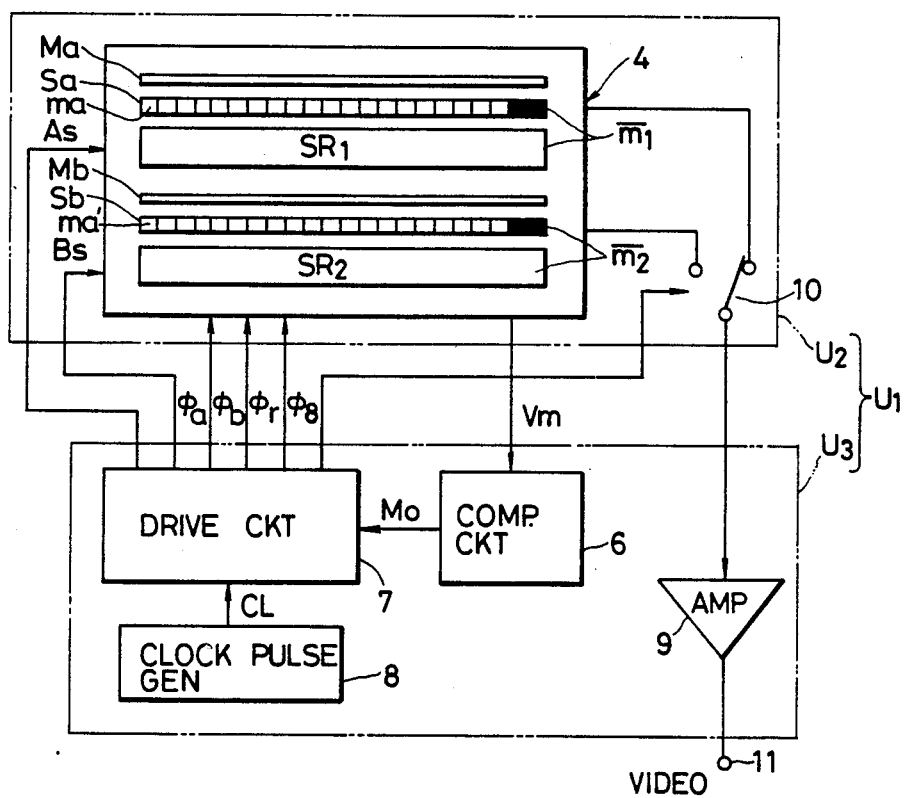
FIG. 5 is a block diagram showing the photoelectric conversion section and an element drive section in FIG. 2 in detail.

FIG. 5 is a block diagram showing the self-scanning type photoelectric conversion element drive device $U_1$ in detail. The element drive section $U_3$ is made up of a comparison circuit 6, a photoelectric element drive circuit 7, a clock pulse generating circuit 8 and an amplifier 9. The comparison circuit 6 receives the output $V_m$ of the light detecting element arrays $M_a$ and $M_b$ of the self-scanning type photoelectric conversion elements 4a and 4b and applies an output $M_o$ produced in response thereto to the photoelectric conversion element drive circuit, as will be described in more detail below. The photoelectric conversion element drive circuit 7, operating in response to the output clock pulse signal CL from the clock pulse generating circuit 8, outputs drive pulse signals $\phi_a$, $\phi_b$ and $\phi_r$ and start pulse signals $A_s$ and $B_s$ for operating the scanning circuits $SR_1$ and $SR_2$ of the self-scanning type photoelectric conversion elements 4a and 4b. The outputs of the photoelectric elements arrays $S_a$ and $S_b$ of the self-scanning type photoelectric conversion elements 4a and 4b are selectively applied through a switching circuit 10 to an amplifier 9, and a video output signal VIDEO is thus provided, as optical intensity distribution data, at the output terminal 11 of the amplifier 9.

Figure 6:
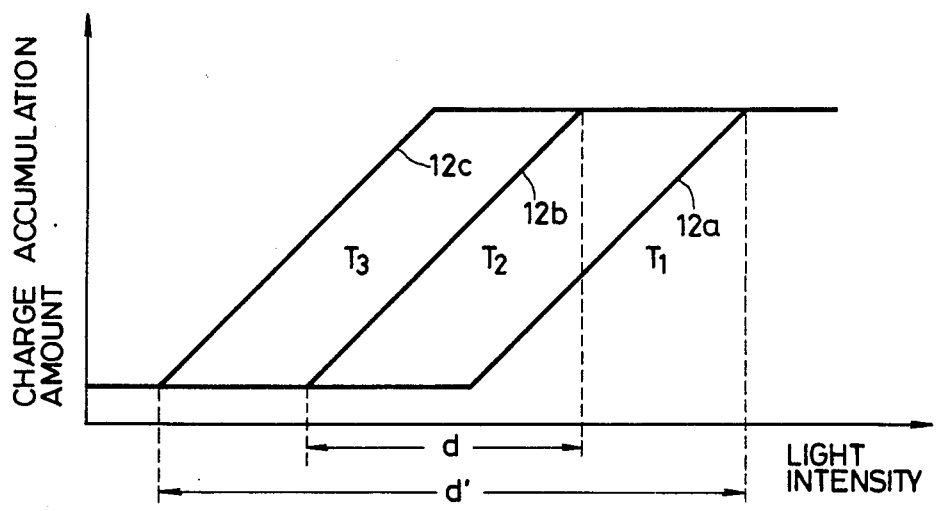
FIG. 6 is a characteristic diagram showing the photoelectric conversion characteristic of the photoelectric element arrays.

FIG. 6 is a diagram showing the photoelectric characteristics of the photoelectric element arrays $S_a$ and $S_b$, which are of the charge accumulation type. Characteristic lines 12a, 12b and 12c correspond to charge accumulation times $T_1$, $T_2$ and $T_3$, respectively. The relation among $T_1$, $T_2$ and $T_3$ is $T_1 < T_2 < T_3$. For instance, if the charge accumulation time $T_2$ is set, the available dynamic range (the region of nonsaturation) is as indicated by reference character d. On the other hand, if the charge accumulation time is changed from $T_1$ to $T_3$, the dynamic range is increased as indicated by reference character d'. Accordingly, in the case where the charge accumulation times of the photoelectric element arrays $S_a$ and $S_b$ are changed in inverse proportion to the average value of the optical intensity distribution, even if the average values of the optical intensities change, the time-series outputs of the photoelectric element arrays $S_a$ and $S_b$, namely, the video output signal VIDEO at the output terminal 11, will not change. That is, the video output signal VIDEO supplied to the contrast detecting circuit $U_4$ is constant at all times.

Figure 7:
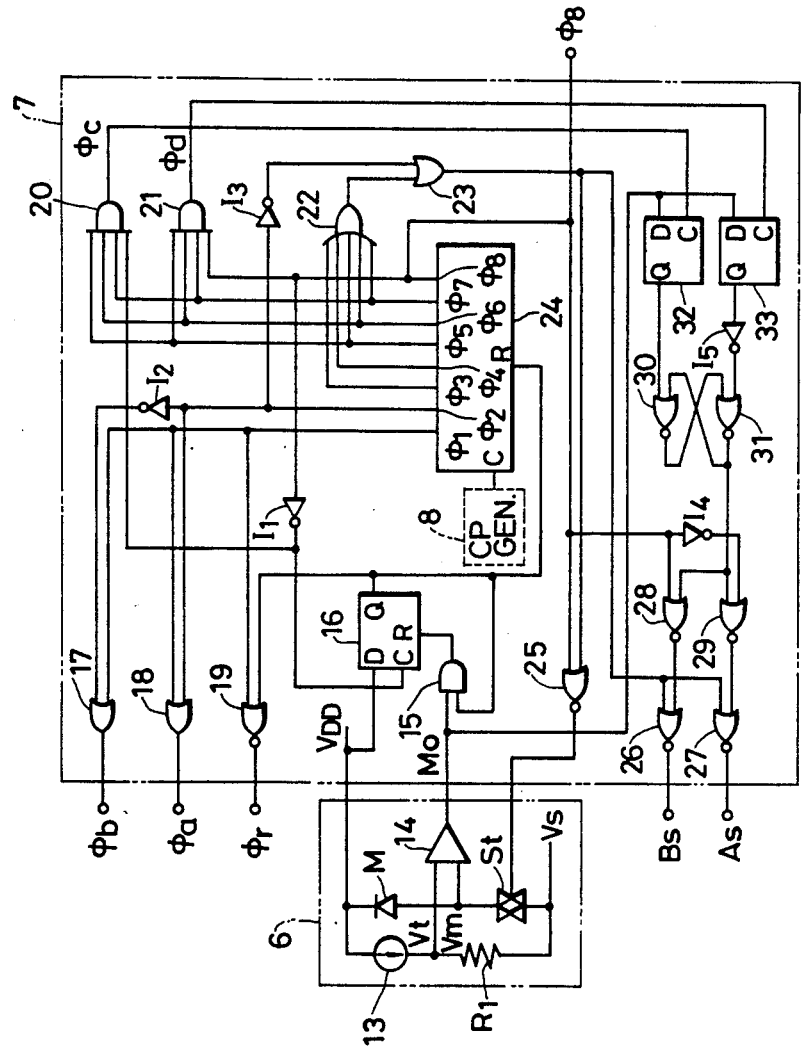
FIG. 7 is a circuit diagram showing the element drive section in FIG. 2 in more detail.

FIG. 7 shows the comparison circuit 6 and the photoelectric element drive circuit 7 in more detail. A light detecting diode M forming part of the comparison circuit 6 is representative of the elements of the light detecting element arrays $M_a$ and $M_b$. The cathode of the diode M is connected to one terminal of a constant current source 13 and a voltage source $V_{DD}$, and the anode is connected to the positive input terminal of a comparator 14 and to one terminal of an analog switch $S_t$. The other terminal of the constant current source 13 is connected through a resistor $R_1$ to a power source $V_s$, to which is also connected the other terminal of the analog switch $S_t$. The connecting point of the constant current source 13 and the resistor $R_1$ is connected to the negative input terminal of the comparator 14. The output terminal of the comparator 14 is connected to the photoelectric element drive circuit 7.

In the photoelectric element drive circuit 7, an AND gate 15 has one input terminal connected to the output terminal of the comparator 14 of the comparison circuit 6. The output terminal of the AND gate 15 is connected to the reset terminal R of a D-type flip-flop 16. The input terminal D of the flip-flop 16 is connected to the constant voltage source $V_{DD}$, and the output terminal Q is connected to the other input terminal of the AND gate 15 and one input terminal of a NOR gate 19. The other input terminal of the NOR gate 19 is connected to an output terminal $\phi_1$ also of an eight-bit binary counter 24. The output terminal $\phi_1$ is connected to first input terminals of OR gates 17 and 18.

An output terminal $\phi_2$ of the binary counter 24 is connected through an inverter $I_2$ to the other input terminal of the OR gate 17 is connected to the other input terminal of the OR gate 18. Output terminals $\phi_3$, $\phi_4$, $\phi_5$, $\phi_6$ and $\phi_7$ of the binary counter 24 are connected to respective input terminals of a five-input OR gate 22. The output terminals $\phi_5$, $\phi_6$ and $\phi_7$ are connected to respective three input terminals of a four-input AND gate 20, the remaining input terminal of which is connected to the clock terminal C of the flip-flop 16. The output terminals $\phi_5$, $\phi_6$, $\phi_7$ and $\phi_8$ of the binary counter 24 are connected to corresponding input terminals of a four-input AND gate 21. The output terminal $\phi_8$ is further connected through an inverter $I_1$ to the clock terminal C of the flip-flop 16. The output terminal Q of the flip-flop 16 is connected to the rest terminal R of the binary counter 24, the clock terminal C of which is connected to the clock pulse generating circuit 8.

The output terminal $\phi_2$ of the binary counter 24 is connected through an inverter $I_3$ to one input terminal of an OR gate 23, the other terminal of which is connected to the output terminal of the OR gate 22. The output terminal of the OR gate 23 is connected to one input terminal of a NOR gate 25, the other input terminal of which is connected to the output terminal $\phi_8$ of the binary counter 24. The output terminal of the NOR gate 25 is connected to the control terminal of the analog switch $S_t$. The output terminal of the OR gate 23 is further connected to first input terminals of NOR gates 26 and 27. The second input terminal of the NOR gate 26 is connected to a NOR gate 28, and the second input terminal of the NOR gate 27 is connected to the output terminal of a NOR gate 29. One input terminal of the NOR gate 28 is connected to the output terminal $\phi_8$ of the binary counter 24, and the other terminal of the NOR gate 28 is connected to one input terminal of the NOR gate 29. An inverter $I_4$ is connected between the other input terminal of the NOR gate 29 and one input terminal of the NOR gate 28. The common input terminal of the NOR gates 28 and 29 is connected to the output terminal of a flip-flop circuit formed with NOR gates 30 and 31, this flip-flop circuit forming a memory section. One input terminal of the NOR gate 30 is connected to the output terminal of a D-type flip-flop 32. One input terminal of the NOR gate 31 is connected through an inverter $I_5$ to the output terminal Q of a D-type flip-flop 33. Both of the input terminals D of the flip-flops 32 and 33 are connected to the input terminal of the AND gate 15 receiving the output of the comparator 14. The clock terminal C of the flip-flop 32 is connected to the output terminal of the AND gate 20, while the clock terminal C of the flip-flop 33 is connected to the output terminal of the AND gate 21.

In the comparison circuit 6 and photoelectric element drive circuit 7 constructed as described above, the photoelectric conversion voltage $V_m$ provided at the anode of the charge accumulation type light detecting diode M is compared with a threshold voltage $V_t$ developed across the resistor $R_1$ in the comparator 14. The charge accumulation for the light detecting diode M takes place on the capacitance of the internal or external output lines of the diode M.

Figure 8:
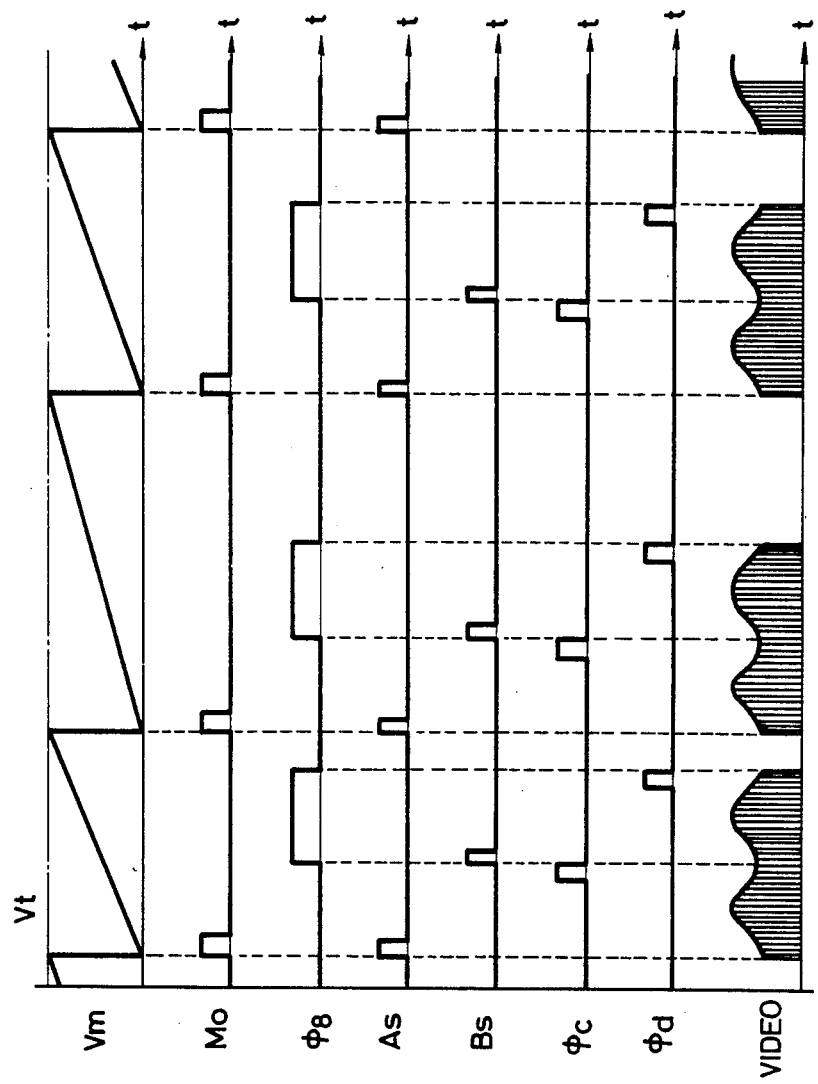
FIG. 8 is a timing chart for a description of pulse signals used in the circuit of FIG. 7.

As shown in a timing chart in FIG. 8, when the photoelectric conversion voltage $V_m$ reaches the threshold voltage $V_t$, the output $M_o$ of the comparator 14 is raised to a high level and a high level output is provided at the output terminal Q of the flip-flop 16. Accordingly, a high level signal is supplied to the reset terminal R of the flip-flop circuit 16 to reset the latter. As a result, the output Q of the flip-flop 16 is set to the low level. This low level signal is supplied to the reset terminal R of the eight-bit binary counter 24, whereupon the counter 24 is enabled to start a counting operation. In response to the output clock pulses from the clock pulse generating circuit 8, the binary counter 24 provides a series of repetitive pulse outputs at the output terminals $\phi_1$ through $\phi_8$.

In response to the outputs from the output terminals $\phi_2$, $\phi_3$ through $\phi_7$ and $\phi_8$, pulses of the start pulse signals $A_s$ and $B_s$ for starting the scanning of the photoelectric element arrays $S_a$ and $S_b$ are provided at the output terminals of the NOR gates 27 and 26, respectively. Furthermore, in response to the signals on the output terminals $\phi_2$, $\phi_3$ through $\phi_7$ and $\phi_8$, an input signal is set for the NOR gate 25 through the inverter $I_3$, the AND gate 22 and the OR gate 23. The output of the NOR gate 25 operates the analog switch $S_t$ such that the voltage level of the anode of the light detecting diode M is set to that of the power source $V_s$. As a result, the light detecting diode M is restored to start charge accumulation again. On the other hand, the output of the output terminal $\phi_8$ is applied through the inverter $I_1$ to the clock terminal C of the flip-flop 16. When the binary counter 24 is reset, the output of the flip-flop 16 is raised to the high level again, and the comparison circuit waits until the anode voltage $V_m$ of the light detecting diode M reaches the threshold voltage $V_t$. The output of the terminal $\phi_8$ is applied to the changeover switch 10 provided on the output side of the self-scanning type photoelectric element array 4 in order to cause the outputs of the photoelectric elements arrays to be applied serially. In the above-described case, the intensity of light received by the light detecting diode M has not reached the predetermined value yet, and, the output of the flip-flop 16 is raised to the high level earlier than the output $M_o$ of the comparator 14.

In response to the outputs from the terminals $\phi_1$ and $\phi_2$ of the binary counter 24, pulses of the scanning pulse signals $\phi_a$ and $\phi_b$ for scanning the photoelectric element arrays $S_a$ and $S_b$ are provided at the output terminals of the OR gates 18 and 17, respectively. Upon reception of the output from the terminal $\phi_1$ and the output from the output terminal of the flip-flop 16, the NOR gate 29 provides a reset pulse $\phi_r$ at the output terminal for resetting the photoelectric element arrays $S_a$ and $S_b$. The relationships of the scanning pulse signals $\phi_a$ and $\phi_b$ and and the reset pulse signal $\phi_r$ will be described with reference to FIGS. 9 and 10 below.

The outputs from the terminals $\phi_5$ through $\phi_8$ and the output from the terminal $\phi_8$, which is inverted by the inverter $I_1$, cause the AND gates 20 and 21 to provide pulses of the latch signals $\phi_c$ and $\phi_d$ which cause the flip-flops 32 and 33 to latch the output $M_o$ of the comparator 14.

As is apparent from the above description, first the start pulse $A_s$ for starting the scanning of the photoelectric element array $S_a$ is generated from the output $M_o$ of the comparator 14 of the comparison circuit 16, and then one photoelectric element array $S_a$ is scanned by the scanning pulse signals $\phi_a$ and $\phi_b$, which are obtained from the outputs of the binary counter 24 in the drive circuit 7. The scanning of the photoelectric element array $S_a$ is continued until the output at the output terminal $\phi_8$ is changed by the latch signal $\phi_c$. When this scanning period has passed, the other photoelectric element array $S_b$ is scanned in response to the start pulse signal $B_s$ within a scanning period corresponding to the period of the latch signal $\phi_d$. Thus, the scanning periods of the photoelectric element arrays $S_a$ and $S_b$ are determined from the periods of the start pulse signals $A_s$ and $B_s$. The video output signal VIDEO is provided at the output terminal 11 connected to the amplifier 9 of the photoelectric conversion section $U_3$.

The photoelectric elements $\overline{m}_1$ and $\overline{m}_2$ of the photoelectric element arrays $S_a$ and $S_b$ are indicated in FIG. 5. These two elements are used to compensate for dark current components which are superposed on the output signals of photoelectric elements $m_a \ldots m_n$ and $m_a' \ldots m_n'$. With the provision of the photoelectric elements $\overline{m}_1$ and $\overline{m}_2$, the VIDEO output signal can be detected more accurately.

Figure 9:
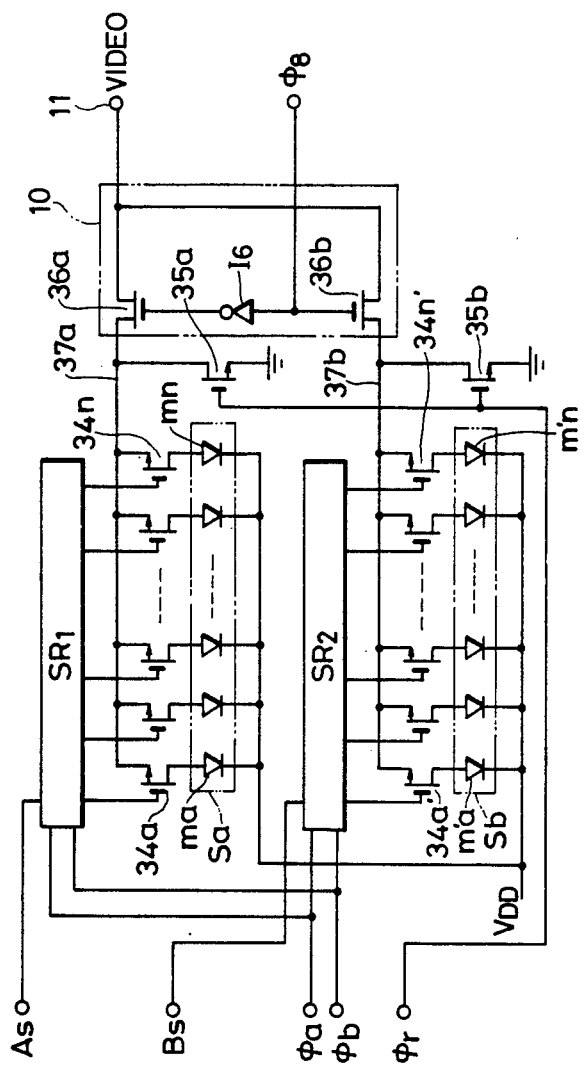
FIG. 9 is a circuit diagram showing self-scanning type conversion elements forming the photoelectric conversion section in more detail.

FIG. 9 is a circuit diagram showing the photoelectric element arrays $S_a$ and $S_b$ and related components in more detail. The photoelectric elements $m_a$ through $m_n$ and $m_a'$ through $m_n'$ forming the photoelectric element arrays $S_a$ and $S_b$ are coupled to switching elements 34a through 34n and 34a' through 34n', respectively. The switching elements 34a through 34n and 34a' through 34n' are connected to respective scanning circuits $SR_1$ and $SR_2$. The switching elements 34a through 34n and 34a' through 34n' are further connected via output lines 37a and 37b to resetting switching elements 35a and 35b, respectively. The resetting switching elements 35a and 35b are connected to respective switching elements 36a and 36b forming the changeover circuit 10. An inverter $I_6$ is connected between the control terminal of the switching elements 36a and 36b. The signal from the output terminal $\phi_8$ of the above-described binary counter 24 (FIG. 7) is applied to the connecting point of the inverter $I_6$ and the switching element 36b.

Figure 10:
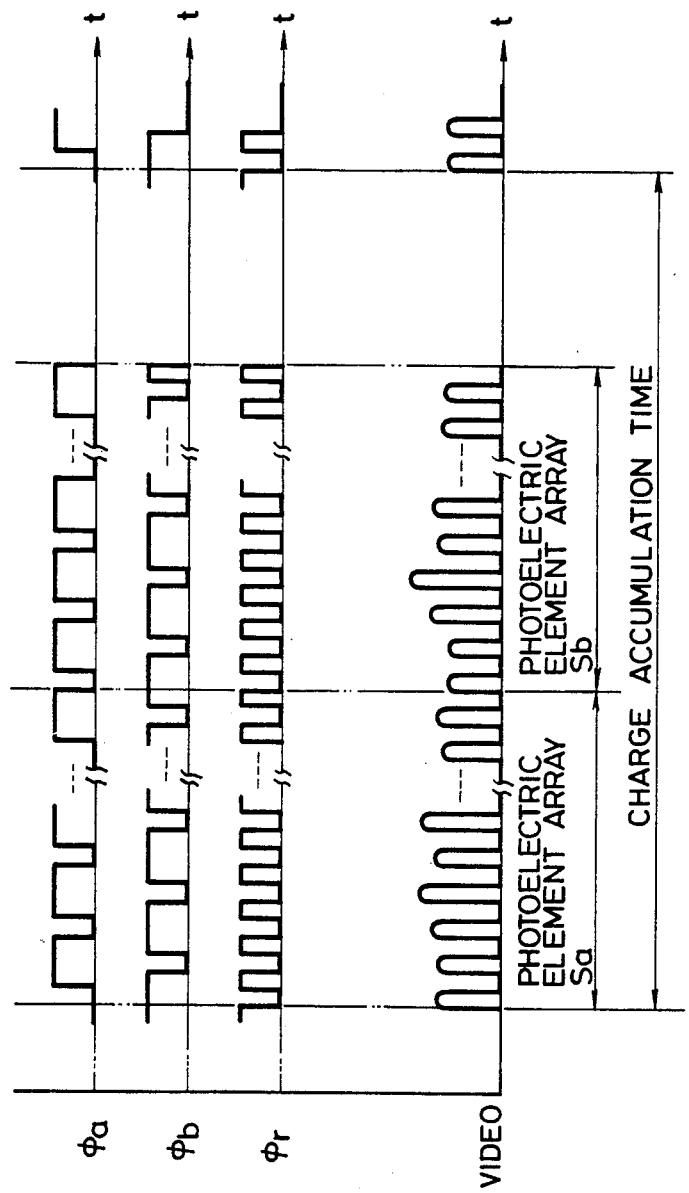
FIG. 10 is a timing chart showing the relationships of scanning pulse signals and a reset pulse signal used for driving the self-scanning type conversion elements and a video output.

The start pulse signal $A_s$ and the scanning pulse signal $\phi_a$ and $\phi_b$ from the element drive circuit 7 are applied to the scanning circuit $SR_1$ for the photoelectric element array $S_a$, whereby the switching elements 34a through 34n are rendered conductive in succession and charges are accumulated in the junction capacitances formed in the photoelectric elements $m_a$ through $m_n$. The charges thus accumulated are applied successively to the output line 37a to produce a portion of the video output signal VIDEO at the output terminal 11. Further, the start pulse signal $B_s$ and the scanning pulse signals $\phi_a$ and $\phi_b$ are supplied to the scanning circuit $SR_2$ for the photoelectric element array $S_b$, whereby the switching elements 34a' through 34n' are rendered conductive successively. As a result, the charges accumulated in the photoelectric elements $m_a'$ through $m_n'$ are applied to the output line 37b in succession, thus further contributing to the video output signal VIDEO at the output terminal 11. In this case, the outputs of the photoelectric element arrays $S_a$ and $S_b$ are switched by the switching elements 36a and 36b through the inverter $I_6$ in accordance with the signal from the output terminal $\phi_8$ to provided a serial video output signal VIDEO. Since the charges accumulated in the junction capacitances associated with the photoelectric elements $m_a$ through $m_n$ and $m_a'$ through $m_n'$ are dissipated upon being extracted across the capacitances associated with the output lines 37a and 37b, the outputs of the photoelectric elements $m_a$ through $m_n$ and $m_a'$ through $m_n'$ are restored to the initial state immediately when the switching elements 35a and 35b are reset by the reset pulse signal $\phi_r$. The relationships of the video output signal VIDEO formed in the manner described above and the scanning pulse signals $\phi_a$ and $\phi_b$ and the reset pulse signal $\phi_r$ are as shown in FIG. 10.

The above description relates to the case where the intensity of light received by the light detecting diode M has not reached the predetermined value. Next, the operation of the circuit in the case where the intensity of light has exceeded the predetermined value will be described with reference to FIG. 11.

It is assumed that the average value of the intensities of light received by the light detecting diodes M is represented by $E_0$. The charge accumulation time of the photoelectric element arrays $S_a$ and $S_b$ is in inverse proportion to the light intensity. This frequency is indicated at the point a on a characteristic line corresponding to a frequency $F_0$, and the video output at the point a' on a characteristic line corresponding to an output level $V_0$. This relation is maintained until the light intensity reaches $E_1$. At the $E_1$ level, the frequency shifts to $F_1$ at the point b, while the video output is shifted to the point b' corresponding to an output level $V_0$.

Figure 11:
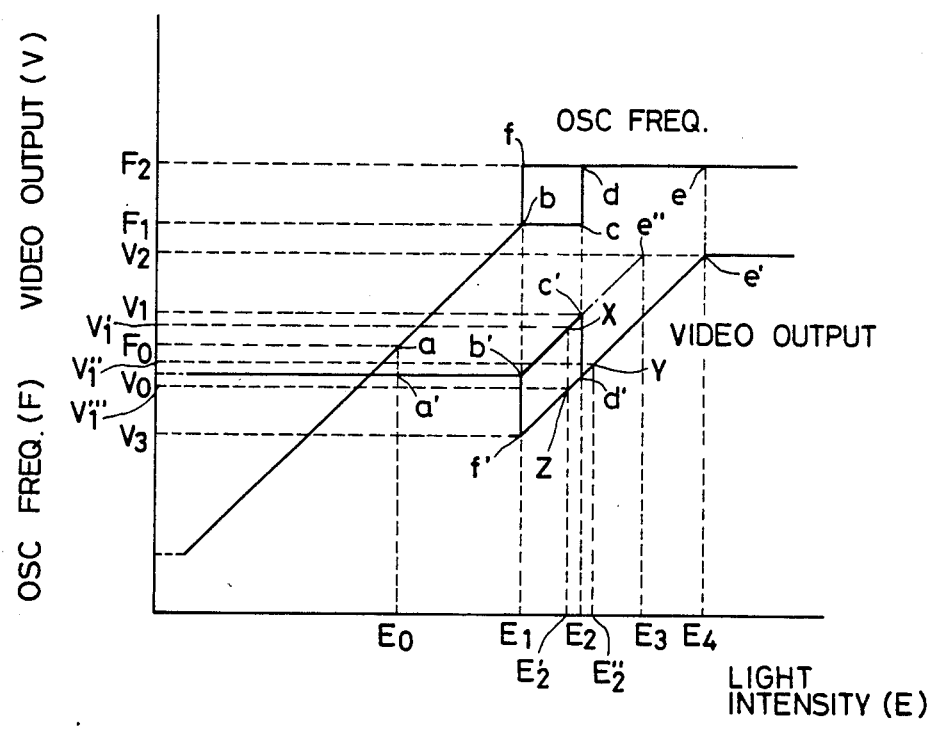
FIG. 11 is a characteristic diagram for a description of the hysteretic characteristics of a video output and a start pulse frequency with respect to light intensities.

When the light intensity is increased to $E_2$ from $E_1$, the frequency is maintained at $F_1$ while the video output increases in proportion to the light intensity. That is, the frequency is shifted from the point b to the point c on the frequency characteristic line, while the video output shifts from the point b' to the point c' on the video output characteristic line. When the light intensity is changed to $E_2$, the frequency shifts from the point c to the point d on the characteristic line, while the video output is shifted from the point d' to the point c'. In this case, the video output corresponding to the point c' is $V_1$ and the video output corresponding to the point d' is $V_0$, which is the same as that for the point b'. Furthermore, the frequency corresponding to the point c is $F_1$, which is the same as that for the point b, and the frequency corresponding to the point d is $F_2$. In FIG. 11 the vertical axis and the horizontal axis are graduated logarithmically (the base of 2), the relation between the frequencies $F_1$ and $F_2$ is $F_2 = 2F_1$, and the relation between the video outputs $V_1$ and $V_0$ is $V_1 = 2V_0$.

When the light intensity is further increased to the range of $E_4$ through $E_3$ from $E_2$, the frequency is maintained at $F_2$, while the video output increases from the point e' to the point d' in proportion to the light intensity. When the light intensity exceeds $E_4$, the video output is maintained at $V_2$ and is saturated because of the charge accumulation capacity. The point e", relating to the light intensity $E_3$, corresponds to the case where the frequency is maintained at the value $F_1$ of the point c. In this case, the video output is saturated when the light intensity is $E_3$. As the relation between the light intensities $E_3$ and $E_4$ is $E_4 = 2E_3$, the width of the unsaturated region is doubled, that is, the effective dynamic range of the device is remarkably increased.

The case will now be considered where the light intensity is increased. When the light intensity decreases from $E_4$ through $E_3$ and $E_2$ to $E_1$, the frequency $F_2$ is maintained unchanged, as indicated by the points e, d and f, while the video output decreases in proportion to the light intensity, as indicated by the points e', d' and f'. When the light intensity decreases to $F_1$, the frequency is shifted from $F_2$, corresponding to the point f, to $F_1$, corresponding to the point b, while the video output is shifted from $V_3$, corresponding to the point f', to $V_0$, corresponding to the point b'. When the light intensity further decreases below $E_1$, the pulse frequency decreases in proportion to the light intensity, while the video output is maintained at $V_0$.

As is apparent from the above description, as the light intensity increases, the pulse frequency changes along a path including the points a, b, c, d, and e while the video output follows a locus along the points a', b', c', d' and e'; and in contrast, as the light intensity is decreased, the pulse frequency follows a path through the points e, d, c, b and a while the video output follows a path through the points e', d', c', b' and a'. That is, the frequency and the video output have hysteretic characteristics.

Due to such characteristics, the dynamic range is increased, and unstable variations of the light intensity can be satisfactorily dealt with as described below.

It is assumed that the light intensity is changed from $E_2'$, close to $E_2$, to $E_2''$, varying at $E_2'$. In this case, with the light intensity $E_2$, the pulse frequency is shifted from $F_1$ corresponding to the point c, to $F_2$ corresponding to the point d, while the video output decreases from $V_1$, corresponding to the point c', to $V_0$, corresponding to the point d'. When the light intensity reaches $E_2''$, the frequency is maintained at $F_2$, while the video output is slightly increased to $V_1''$, corresponding to the point Y. When the light intensity changes from $E_2''$ to $E_2'$, the frequency is maintained at $F_2$, and the video output is changed to $V_1'''$, corresponding to the point Z, without returning to the first value $V_1$, corresponding to the point X. The range of variation from $V_1''$ to $V_1'''$ is smaller than the range of variation from $V_1'$ to $V_1'''$. Therefore, even if the light intensity varies greatly in the vicinity of $E_2$, the video output is nevertheless maintained within a small range of variation.

Figure 12:
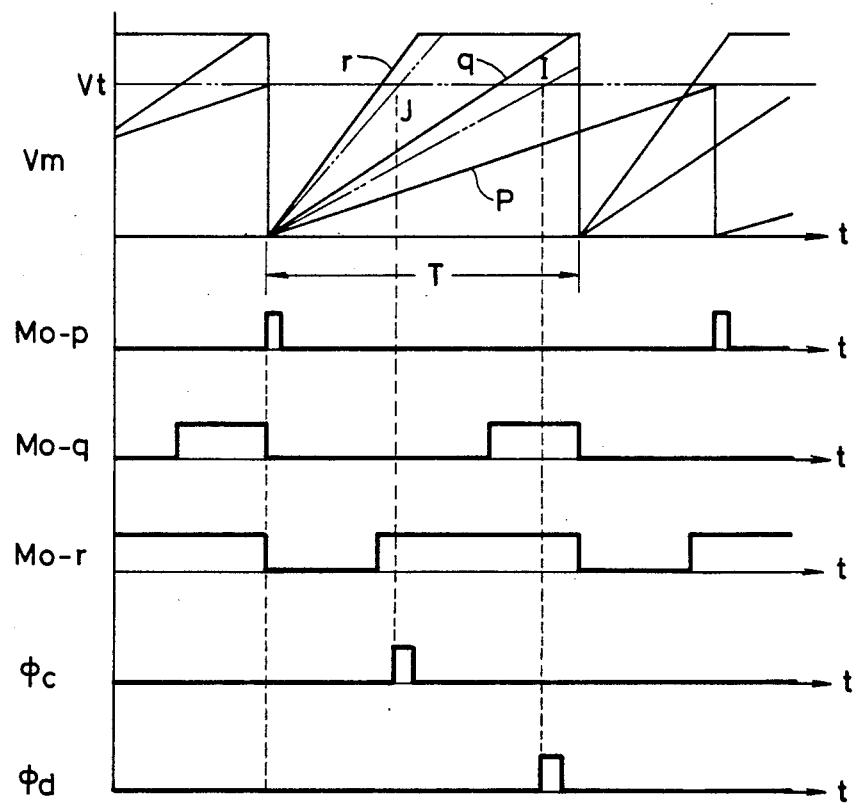
FIG. 12 is a timing chart used for a description of the relationships of the anode voltage waveform of a light detecting diode, the outputs of a comparison circuit and latch signals.

FIG. 12 shows the relationships of the waveform of the anode voltage $V_m$ of the light detecting diode M and the waveforms of the output $M_o$ of the comparator 14 and the latch signals $\phi_c$ and $\phi_d$. The operation of the device of the invention, which is carried out according to the operating principles illustrated in FIG. 10, will be described with reference to FIG. 12, the circuit diagram of FIG. 7, and timing charts of FIGS. 13, 14, and 15.

Figure 13:
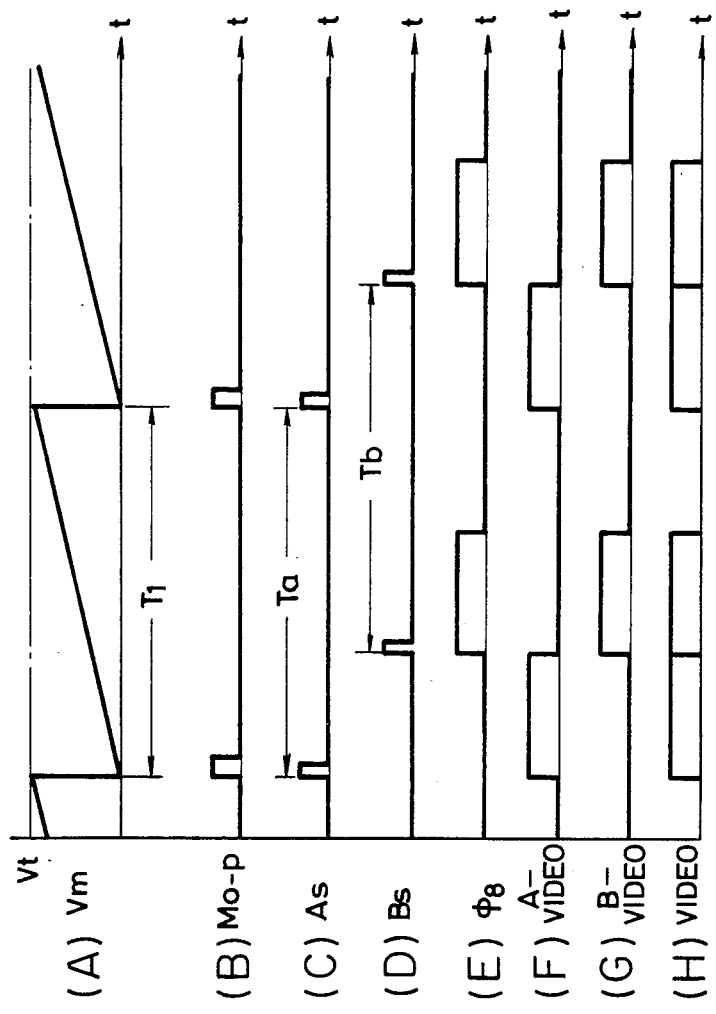
FIGS. 13, 14 and 15 are timing charts used for a description of the hysteretic operations of the circuit, of which FIG. 13 relates to the case where the light intensity is smaller than a predetermined value, FIG. 14 to the case where the light intensity has reached a value with which the hysteretic operation is carried out, and FIG. 15 the case where the light intensity exceeds the predetermined value and the hysteretic operation is carried out again.
Figure 14:
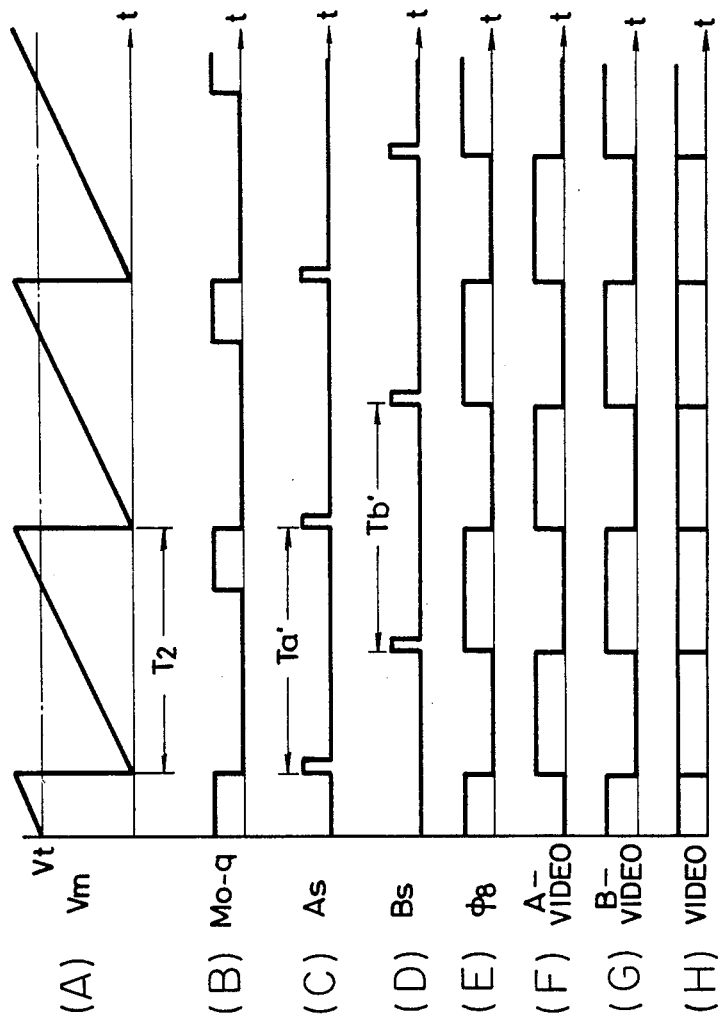

The waveform P of the anode voltage $V_m$ in FIG. 12 corresponds to a waveform (A) in FIG. 13. In this case, the charge accumulation times $T_a$ and $T_b$ of the photoelectric element arrays $S_a$ and $S_b$ are in inverse proportion to the light intensity, the period $T_a$ of the start pulse signal $A_s$ is equal to the period $T_b$ of the start pulse signal $B_s$ (see waveforms (C) and (D) of FIG. 13), and the periods $T_a$ and $T_b$ are equal to the charge accumulation time $T_1$ of the light detecting diode M. In this case, the output $M_o$-p of the comparator 14 is at the low level at the rising edges of the latch signals $\phi_c$ and $\phi_d$ (see FIG. 12 and waveform (B) of FIG. 13), and therefore the outputs of the flip-flops 32 and 33 are set to the low level so that the output of the flip-flop formed by the NOR gates 30 and 31 is set to the low level. Accordingly, when the signal at the output terminal $\phi_2$ is at the high level and the signals at the output terminals $\phi_3$ through $\phi_8$ are at the low level, a pulse of the start pulse signal $A_s$ is generated, and when the signal at the output terminal $\phi_2$ is at the high level, the signals at the output terminals $\phi_3$ through $\phi_7$ are at the low level, and the signal at the output terminal $\phi_8$ is at the high level, a pulse of the start pulse signal $B_s$ is provided. As a result, a video output A-VIDEO, produced by scanning of the photoelectric element array $S_a$, is obtained when the signal at the output terminal $\phi_8$ is at the low level, and a video output B-VIDEO, produced by scanning of the photoelectric element array $S_b$ is obtained when the signal at the output terminal $\phi_8$ is at the high level (see waveforms (F) and (G) of FIG. 13). Accordingly, a serial video output signal VIDEO is obtained at the output terminal 11 as shown at (H) in FIG. 13.

The provision of a serial video output as described above is continued until the waveform line of the anode voltage $V_m$ intersects the reference level at the point I. At the point I, the output $M_o$-q of the comparator 14 is raised to the high level, and simultaneously the signal at the output terminal $\phi_8$ is set to the low level so that the output of the output terminal Q of the flip-flop 16 is raised to the high level. Accordingly, the charge accumulation time of the photoelectric element array $S_a$ is set to a critical value $T_a'$ as shown at (C) in FIG. 14. The value $T_a'$ is equal to the charge accumulation time $T_2$ of the light detecting diode M (see waveform (A) in FIG. 14) and to the count time T of the binary counter 24 (FIG. 12).

When the slope of the waveform line of the anode voltage $V_m$, increasing with light intensity, passes through the point J in FIG. 12, the waveform of the anode voltage $V_m$ is as indicated at q, and the output $M_o$-q is set to the low level and the high level, respectively, at the rising edges of the the latch signals $\phi_c$ and $\phi_d$. Therefore, the outputs at the output terminals Q of the flip-flop 32 and 33 are set to the low level and the high level, respectively, and the signals applied to the NOR gates 30 and 31 forming the flip-flop are set to the low level. Thus, the preceding data is held. In this case, the output of the flip-flop formed by the NOR gates 30 and 31 is maintained at the low level, and the charge accumulation time of the photoelectric elements $m_a$ through $m_n$ remains $T_a'$. Accordingly, the level of the video output signal VIDEO is shifted from the point b' to the point c' on the characteristic line in FIG. 11.

When the light intensity is further increased to permit the slope of the waveform line to pass through the point J as shown in FIG. 12, the waveform of the anode voltage $V_m$ becomes as indicated at r and the output $M_o$-r of the comparator 14 is at the high level at the rises of the latch signals $\phi_c$ and $\phi_d$, and therefore the output terminals Q of the flip-flops 32 and 33 provided high level signals. Therefore, both of the NOR gates 30 and 31 receive high level signals, and hence the outputs of NOR gates 28 and 29 are raised to the high level. Accordingly, when the signal at the output terminal $\phi_2$ is at the high level and the signals at the output terminals $\phi_3$ through $\phi_7$ are at the low level, pulses of the start pulse signals $A_s$ and $B_s$ are provided simultaneously.

Figure 15:
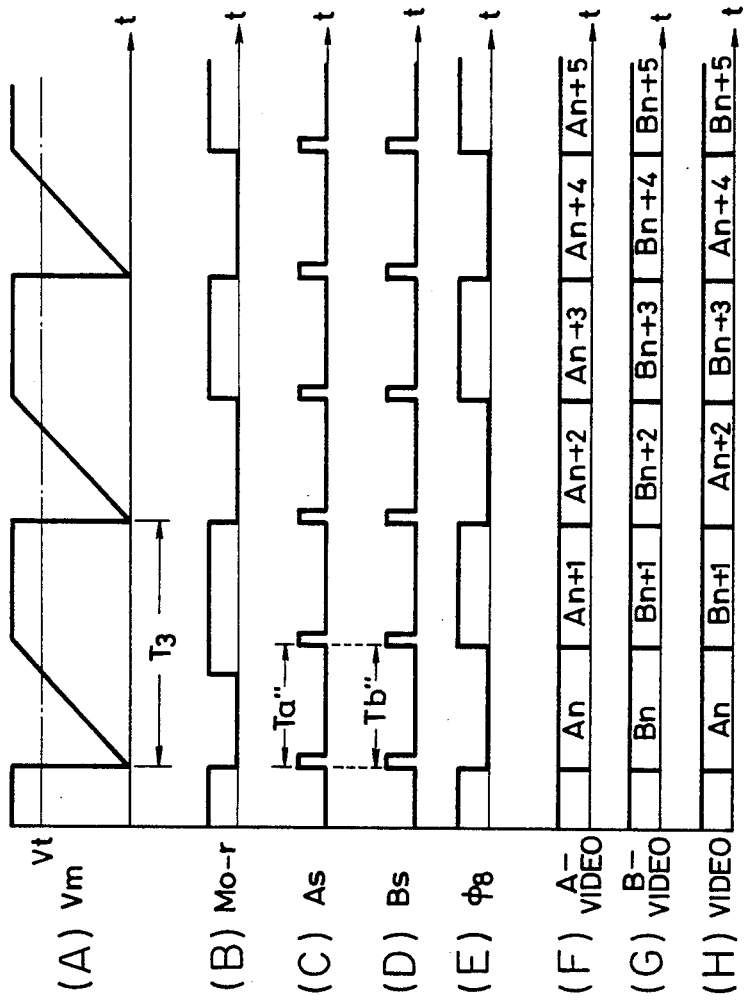

Thus, as shown in FIG. 15, two pulses of each of the start pulse signals $A_s$ and $B_s$ are generated in the count period of the binary counter 24, namely, the period $T_s$. The relation of the period $T_a''$ and $T_b''$ of the start pulse signals $A_s$ and $B_s$ and the period $T_s$ is: $T_a''=T_b''=(\frac{1}{2})T_s$. The period $T_3$ is equal to the period $T_2$ of the anode voltage $V_m$ in FIG. 14.

When the anode voltage $V_m$ has passed through the point J, the frequency of the start pulse signals $A_s$ and $B_s$ $F_2=2\ F_1$ is established as shown in FIG. 11, and the charge accumulation time of the photoelectric elements is reduced to half that in the case where the anode voltage $V_m$ has the waveform q. Accordingly, the video output is reduced to half that in the preceding case (shifting from the point c' to the point d' on the characteristic line in FIG. 11). Thus, as the light intensity is further increased, the video output is increased in proportion to the light intensity while shifting from the point c' to the point d' on the characteristic line. In this case, the start pulse signals $A_s$ and $B_s$ are outputted simultaneously (see waveforms (F) and (G) of FIG. 15), and therefore the photoelectric element arrays $S_a$ and $S_b$ are scanned in a parallel mode.

As is apparent from waveforms (E) through (H) of FIG. 15, parts $A_n$, $A_{n+2}$, $A_{n+4}$, . . . of the A-VIDEO output of the photoelectric element array $S_a$ are produced when the output at the terminal $\phi_8$ is at the low level, while parts $B_n, B_{n+1}, B_{n+3}, B_{n+5}, \ldots$ are produced when the output at the terminal $\phi_8$ is at the high level, thus forming the complete video output signal (waveform (H) in FIG. 15) provided at the output terminal 11. In other words, although the outputs of the photoelectric element arrays $S_a$ and $S_b$ are provided in parallel, the two outputs are arranged in series to thus form the video output at the output terminal 11.

The case where the light intensity is decreased will be considered once more. When the waveform line of the anode voltage $V_m$ has passed through the point J, the output $M_o$-q of the comparator 14 is set to the low level and the high level, respectively, at the rising edges of the latch signals $\phi_c$ and $\phi_d$, the outputs of the flip-flops 32 and 33 are also set respectively to the low level and the high level, and the NOR gates 30 and 31 receive the low level signals. Accordingly, the preceding data is held in the flip-flop formed by the NOR gates 30 and 31, and the output of this flip-flop is maintained at the high level. As a result, the start pulse signals $A_s$ and $B_s$ are obtained simultaneously, and this state is continued until the waveform line of the anode voltage $V_m$ reaches the point J. This state corresponds to the variation of the points e, d and f on the pulse frequency characteristic line and to the variation of the points e', d' and f' on the video output characteristic line.

When the light intensity changes to $E_1$ and the waveform line of the anode voltage $V_m$ passes through the point I, as the output $M_o$-p of the comparator 14 is at the low level at the rising edges of the latch signals $\phi_c$ and $\phi_d$, the outputs of the flip-flops 32 and 33 are set to the low level. Accordingly, the low level signal and the high level signal are applied respectively to the NOR gates 30 and 31, the flip-flop formed by the NOR gates 30 and 31 is reset, and the output of the NOR gate 31 is forcibly set to the low level. As a result, the start pulse signal $A_s$ is obtained when the output at the output terminal $\phi_8$ is at the low level, and the start pulse signal $B_s$ is obtained when the output at the output terminal $\phi_8$ is at the high level. This corresponds to the fact that, as indicated in FIG. 11, the pulse frequency is changed from $F_2$ to $F_1$ and the point f is shifted to the point b on the characteristic line, and that the video output is changed from $V_3$ to $V_0$ and the point f' is shifted to the point b'.

When the light intensity becomes smaller than $E_1$, the charge accumulation time of the photoelectric elements is increased in proportion to the light intensity, and therefore the video output is maintained at $V_0$. This corresponds to the fact that, again as in indicated in FIG. 11, the point b is shifted to the point a on the characteristic line while the point b' is shifted to the point a' on the characteristic line.

As is apparent from the above description, according to the invention, a self-scanning type photoelectric conversion element composed of a pair of photoelectric element arrays is driven to obtain photoelectric outputs successively from the photoelectric element arrays, and when the light intensity exceeds a predetermined value, the photoelectric element arrays are driven in a parallel mode wherein outputs are obtained alternately from the photoelectric element arrays, and when the light intensity is smaller than the predetermined value, the photoelectric element arrays are driven in a serial mode to provide outputs serially. A common signal processing circuit is used. Accordingly, the effective dynamic range of the device is increased, and further the processing circuit is used commonly. Thus, the self-scanning type photoelectric conversion element drive device provided by the invention satisfactorily meets the above-described requirements.

Accordingly, the invention can be effectively applied to image pickup devices such as a single-lens reflex camera and a television camera which are used in the case where the light intensity of the object's image is distributed over a wide range and which must detect the focused position with high accuracy.

We claim:

1. A focus detecting device comprising:
   first and second photoelectric conversion element arrays, each of the said arrays including a plurality of photoelectric elements arranged at positions corresponding to predetermined positions in a received image;
   light intensity detecting means for detecting an intensity of light in said image; and
   means for scanning said first and second arrays to read out charges from said photoelectric elements, said scanning means operating in response to an output of said light intensity detecting means for scanning said first and second arrays in series when a light intensity sensed by said light intensity detecting means is below a predetermined value and scanning said arrays in parallel when said sensed intensity is above said predetermined value.

2. The focus detecting device of claim 1, wherein said scanning means comprises first and second shift registers for applying reading pulses to photoelectric elements of said first and second arrays, respectively, means for applying first and second start pulse signals to said first and second shift registers, respectively, and switching means, operating in response to an output of said light intensity detecting means for selectively connecting outputs of said first and second arrays to a video output terminal.

3. The focus detecting device of claim 2, wherein an output of said light intensity detecting means is applied to said photoelectric elements to reset said photoelectric elements when said light intensity detecting means is in a first predetermined count state indicative of a first predetermined light intensity.

4. The focus detecting device of claim 3, wherein said light intensity detecting means comprises comparing circuit means for comparing a signal representing an intensity of light in said image with a predetermined reference potential.

5. The focus detecting device of claim 4, wherein said comparing circuit means comprises a comparator having a first input terminal coupled to a source of said predetermined reference potential and a second input terminal receiving said signal representing said intensity of light; and an analog switch for coupling a second input predetermined potential to said second input terminal in response to an output signal from said light intensity detecting means indicative of a second predetermined count state of said light intensity detecting means indicative of a second predetermined light intensity, an output of said comparator being coupled to a reset input terminal of said light intensity detecting means.

6. The focus detecting device of claim 5, wherein said light intensity detecting means comprises counter means, and wherein said counter means comprises a binary counter; a first flip-flop having a reset input coupled to an output of said comparator, an output coupled to a reset input of said binary counter, and a clock input coupled to a predetermined output of said binary counter; second and third flip-flops; first and second decoder means for decoding third and fourth count states of said binary counter and setting states of said second and third flip-flops, respectively, accordingly; a fourth flip-flop having opposing inputs coupled to outputs of said second and third flip-flops; third decoder means for decoding a fourth predetermined state of said binary counter; and gating means for producing said start pulse signals in response to an output of said fourth flip-flop and outputs of said third decoder means.

* * * * *